United States Patent [19]

Hosoya et al.

[11] Patent Number: 5,268,984
[45] Date of Patent: Dec. 7, 1993

[54] COATED OPTICAL FIBER AND METHOD OF PRODUCING THE SAME

[75] Inventors: Toshifumi Hosoya; Tomoyuki Hattori; Kohei Kobayashi, all of Kanagawa, Japan

[73] Assignee: Sumitomo Electric Industries, Ltd., Osaka, Japan

[21] Appl. No.: 868,643

[22] Filed: Apr. 15, 1992

[30] Foreign Application Priority Data

Apr. 19, 1991 [JP] Japan ................................. 3-113833

[51] Int. Cl.$^5$ .............................................. G02B 6/22
[52] U.S. Cl. .................................................. 385/128
[58] Field of Search ............... 385/121, 126, 127, 128, 385/141, 145, 147

[56] References Cited

FOREIGN PATENT DOCUMENTS

| | | |
|---|---|---|
| 0114092 | 7/1984 | European Pat. Off. |
| 0323635 | 7/1989 | European Pat. Off. |
| 55-10470 | 1/1980 | Japan |
| 57-066116 | 4/1982 | Japan |
| 58-082205 | 5/1983 | Japan |
| 1115964 | 5/1989 | Japan |

OTHER PUBLICATIONS

Paek et al, "High Speed Coating of Optical Fibers with UV Curable Materials at a Rate of Greater Than 5m/sec", Applied Optics, vol. 20, No. 23, Dec. 1981, New York, pp. 4028–4034.

Primary Examiner—Akm E. Ullah
Attorney, Agent, or Firm—Cushman, Darby & Cushman

[57] ABSTRACT

A coated optical fiber of the invention is constructed by coating an energy beam curable resin onto the outer periphery of a wiredrawn optical fiber and curing the resin by radiating an energy beam to the resin to thereby provide a coating layer on the optical fiber. The temperature of peak mechanical loss tangent, Tan δ, of the energy beam curable resin prior to curing is 25° C. or lower.

7 Claims, 2 Drawing Sheets

FIG. 1(PRIOR ART)
FIG. 2(PRIOR ART)
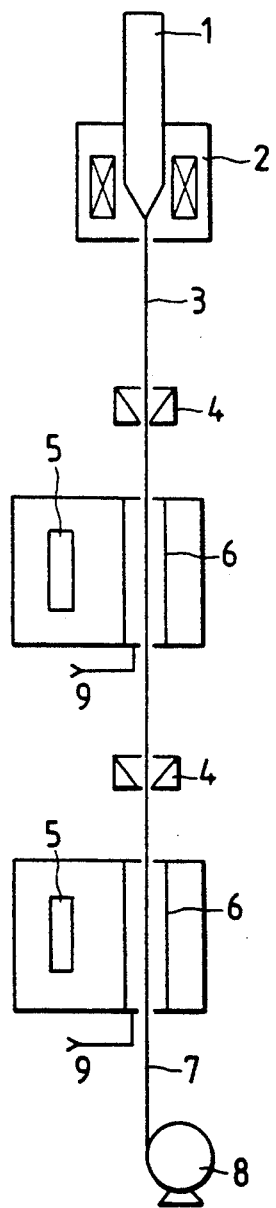
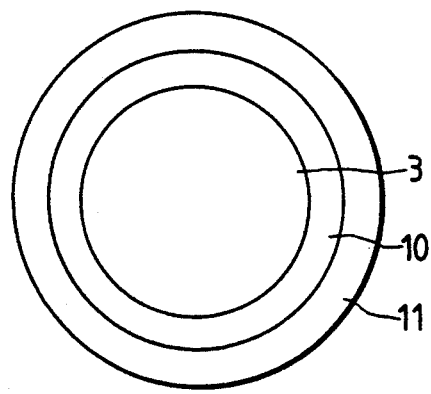

COATED OPTICAL FIBER AND METHOD OF PRODUCING THE SAME

BACKGROUND OF THE INVENTION

The present invention relates to a coated optical fiber including a coating layer formed by curing a resin on the outer periphery of an optical fiber by means of radiation of energy beams such as an ultraviolet ray, and a method of producing the same. In more detail, the present invention relates to the improvement in the coating resin of a coated optical fiber.

An optical fiber is used in such a manner that it is coated with a resin for the purpose of mechanical protection. Generally, to enhance productivity the coating resin is an energy beam curable resin which can be cured by radiation of ultraviolet ray or the like.

FIG. 1 is a schematic view showing the outline of an apparatus for manufacturing a general coated optical fiber. In FIG. 1, to manufacture a coated optical fiber 7, a wiredrawn optical fiber 3 is coated with an energy beam curable resin by a resin coating device 4 mainly consisting of a die and a point, and the curable resin is cured within a curing device 5 to thereby provide a single coating layer or a plurality of coating layers of resin, and then the optical fiber with such resin coating layer or layers is taken up by a take-up device 8.

FIG. 2 shows an example of a section of the coated optical fiber 7 manufactured in this manner. In general, the coated optical fiber has a double coating structure consisting of a buffer layer 10 and a protective layer 11 which are respectively made of an energy beam curable resin applied to and cured on the periphery of the optical fiber 3 composed of glass.

On the other hand, in recent years, with the spread of the amounts of production of optical fibers, the wiredrawing speeds of the optical fibers have been steadily increasing. For this reason, such a strong need exists for a resin to be used as a coating material that can be applied to the surface of the glass in good and uniform condition over a wide range of wiredrawing speeds.

Normally, if the wiredrawing speed of the fiber is increased, then there arises a phenomenon that the resin is difficult to have to attach to the glass because the fiber enters a die the first layer applied before the glass melted in a furnace is cool enough for the resin to attach to the glass.

Consequently, on the high speed side, the coating diameter of the resin is decreased and, as a result of this, the coating resin varies in thickness according to the wiredrawing speeds. In order to solve this problem, for example, in Japanese Patent Unexamined Publication No. 55-10470, there is proposed a method in which glass is forcibly cooled down prior to entrance into a die to thereby prevent a resin from being coated poorly, and the temperature of the glass is controlled to thereby control the covering diameter to a desired thickness.

However, if the glass is actually cooled down and is then wiredrawn at a high speed, then the covering diameter of the first coating layer tends to be larger than that obtained at a low speed. It is believed that this is because the pulling force of the glass is increased due to the increased wiredrawing speed and thus a larger quantity of resin is coated to the glass when compared with coating at the low speed.

As a result, in order to keep the covering diameter constant in a wide range of wiredrawing speeds, the temperature of the glass must be frequently and finely adjusted, which requires a very complicated controlling operation.

SUMMARY OF THE INVENTION

The present inventors, after the investigation of the above-mentioned problems from various aspects, have found that by measuring the dynamic viscoelasticity property of an energy beam curable resin in the liquid state thereof, which is coated on an optical fiber, selecting only the resin with the temperature of peak mechanical loss tangent, Tan $\delta$, of 25° C. or lower and conducting the wire-drawing, a coated optical fiber having a constant covering diameter can be produced in a wide range of wiredrawing speeds without requiring the fine adjustments of the glass temperature. In this manner, the present inventors have completed the present invention.

In other words, according to the present invention, there is provided a coated optical fiber manufactured by coating an energy beam curable resin onto the outer periphery of a wiredrawn optical fiber and curing the resin by radiation of energy beams, characterized in that the peak temperature of the loss tangent, Tan $\delta$, of the energy beam curable resin prior to the curing thereof is 25° C. or lower. The optical fiber is wiredrawn preferably at a production speed of 600 m/min. or more. The viscosity of the energy beam curable resin at a temperature of 25° C. is preferably in the range of 2,000 cps–3,000 cps.

BRIEF DESCRIPTION OF THE DRAWINGS

FIG. 1 is a schematic view showing the outline of an apparatus for manufacturing a general coated optical fiber;

FIG. 2 is a section view of a general coated optical fiber;

DETAILED DESCRIPTION OF THE INVENTION

The present invention will be described below in detail.

In the present invention, in order to provide a coated optical fiber having a stable covering diameter in a wide range of production speeds, for example, in a range of 200 m/min. or more, preferably 600 m/min. or more, the temperature of peak mechanical loss tangent, Tan $\delta$, of the energy beam curable resin prior to curing thereof must be 25° C. or lower.

Figure 4:
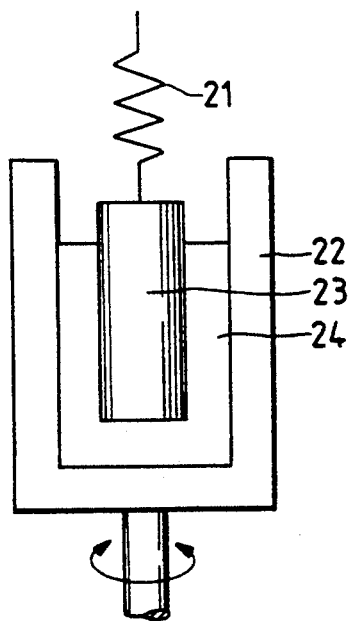
FIG. 4 is a schematic view of an example of device for obtaining the Tan $\delta$.

The mechanical loss tangent Tan $\delta$ is obtained from the dynamic viscoelasticity of a sample evaluated by, for example, an oscillating coaxial cylinder viscometer as shown in FIG. 4 in which an outer cylinder 22 is vibrated and a shear stress applied to an inner cylinder 23 with a spring 21 is detected. The shear strain $\epsilon$ and the shear stress $\sigma$ generated in a sample 24 are expressed by $$\epsilon = \epsilon_0 \exp(i\omega t) \text{ and}$$

$$\sigma = \sigma_0 \exp(\omega t),$$

where, i: imaginary number unit, $\omega$: angular velocity, and t: time. The complex modulus of elasticity, $G^*(\omega)$, and the mechanical loss tangent, Tan δ, of the sample at a given constant temperature are given by the following equation:

$$G^*(\omega) = \sigma/\epsilon = G'(\omega) + iG''(\omega)$$

$$\text{Tan } \delta = G''(\omega)/G'(\omega)$$

where, $G'(\omega)$: storage modulus of elasticity and $G''\pi(\omega)$: is the loss modulus of elasticity.

Figure 3:
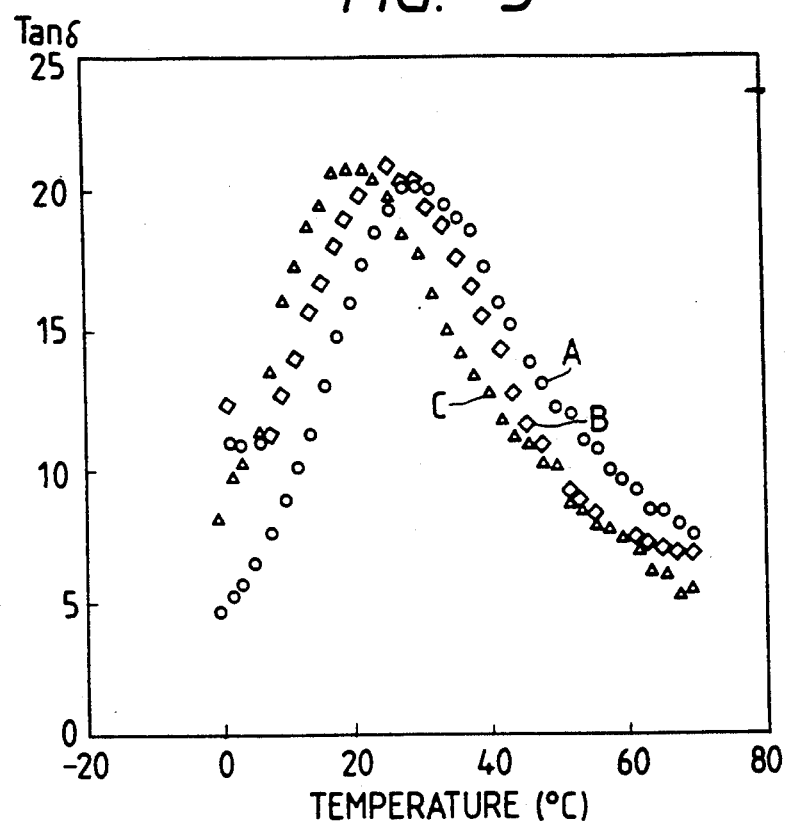
FIG. 3 is a graph of loss tangent as a function of temperature of coating resins employed in the illustrated embodiment of the invention.

The value of Tan δ of a resin is a function not only of an angular velocity, as indicated in the above equation, the temperature the temperature of the resin. The tendency of the values, as can be understood from the graph shown in FIG. 3, provides an upwardly projecting curved line having the maximum peak at a certain temperature. In general, the resin shows its property as an elastic body (a non-Newtonian fluid) more outstandingly if the peak temperature of, Tan δ is higher than a working temperature.

The lower the temperature of peak Tan δ of the energy beam curable resin, serving as a coating resin, in the liquid state thereof prior to curing is, the smaller are the variations of the covering diameter. If the peak temperature is 25° C. or lower, then the diameter variations can be reduced down to a very small level such as ±2 μm or less in a range of wiredrawing speeds of 200–1,000 m/min.

If a coating resin having the Tan δ peak temperature exceeding 25° C. is used, then the variations of the covering outside diameter are increased. The increment in the variations makes it impossible to manufacture the coated optical fiber stably in a wide range of production speeds, with the result that it is difficult to produce the coated optical fiber of high quality.

It should be noted here that the temperature-Tan δ characteristic of the coating resin in the present invention is an invariable index independent of the composition of the resin. For this reason, the invention can be applied to all coating resin materials for the optical fiber manufactured generally in such a method as shown in FIG. 1.

The temperature of peak Tan δ of the resin can be realized by changing the cohesive power of an oligomer and the forms and lengths of chains forming the skeleton of the resin. However, it is difficult to calculate the value of the temperature of peak Tan δ with accuracy only by means of a theoretical design.

On the other hand, Tan δ as a function of temperature can be measured easily by use of a concentric double cylinder method as disclosed in the "Rheology, second edition" written by Tsurutaro Nakagawa and published by Iwanami Zensho, at page 205, or a cone plate method which is an improved version of the concentric double cylinder method.

Although the viscosity of the energy beam curable resin serving as the coating resin is not specifically limited, in order to control the outside diameter of the coating resin to a set value, it is desirable that the viscosity of the resin is 5,000 cps or less, preferably in a range of 2,000 cps–3,000 cps.

For example, if the resin viscosity is high and on the order of 6,000 cps, then the variations of the resin outside diameter remain in an allowable range, but the absolute value of the outside diameter tends to be higher than the set value.

Generally, there are available energy beam curable resins which can be easily cured by means of light such as an ultraviolet ray, heat or the like. Examples of such resins are, an ultraviolet ray curable urethane (meta-)acrylate resin, an ultraviolet ray curable silicone resin, a thermosetting silicone resin, an ultraviolet ray curable epoxy (meta-)acrylate resin, an ultraviolet ray curable silicone (meta-)acrylate resin, an ultraviolet ray curable ester (meta-)acrylate resin, a polyvinylidene fluoride resin, and the like.

The resin coating may be a single layer or a plurality of layers. In the case of two layers, one of the layers is composed of a relatively soft resin material acting as a protective layer (a primary coating layer) to protect the surface of the bared optical fiber, and the other is formed of a relatively hard resin material acting as a buffer coating (a secondary coating) to facilitate the handling of the optical fiber.

It is well known that the composition of the energy beam curable resin affects the rheology characteristic in the liquid state. For example, in a thesis titled "Rheology of a UV Ray Curable Coating in the Optical Fiber High-speed Wiredrawing" written by Hiroyuki Ito and three other persons, which was provided as previous information to the Fifth Photopolymer Conference, 1988, it was concluded that, from the measurement of the angular velocity-Tan δ properties of resins having different compositions prior to curing, in order to suppress the vibration of the bared optical fiber when the resin is coated thereto, a resin having a small Tan δ in a high angular velocity area is desirable.

As a result of the examination of the relationship between the optical fiber wiredrawing speeds and the covering diameters (that is, the actually attached amounts of the resin), the present inventors have found that the reason why the covering diameter of the resin is increased as the optical fiber wiredrawing speeds are increased is the Barus effect.

In other words, when the coating resin is passing through a die hole, if the passing time of the coating resin is short, then molecular chains in the resin are not loosened completely under a shearing stress and thereby store part of the shearing energy as an elastic deformation, with the result that the compression stress of the resin is released at the exit of the die hole and thereby causes the covering diameter to increase.

The increase of the diameter due to the Barus effect is increased as the passing time of the covering resin through the die hole is decreased and, therefore, the diameter increases as the wiredrawing speed is increases.

In view of the above, in order to minimize the influences of the Barus effect, it is effective to select, a resin having a small elastic property, that is, a low Tan δ peak temperature.

After several repeated experiments based on the above viewpoint, the present inventors have found that, by selecting a resin having the Tan δ peak temperature of 25° C. or lower in the liquid state, the variations of the covering (coating) diameter can be suppressed to within ±2 μm over a wide wiredrawing speed range of 200–1,000 m/min.

Description will be given below of examples of a coated optical fiber according to the present invention. However, the scope of the present invention is not limited to the examples illustrated in this specification.

Five kinds of ultraviolet ray curable resins as shown in Table 1 are used as a buffer coating layer 10. Five kinds of coated optical fibers 7 as shown in FIG. 2 are manufactured by an optical fiber manufacturing method as shown in FIG. 1.

For reference, FIG. 3 shows a graph of curved the Tan δ temperature relationship of resins A-C.

The resins used are all composed mainly of an ultraviolet ray curable urethane acrylate and the structure of an oligomer and the density of a monomer are changed to thereby vary the values of the viscosities and the peak Tan δ temperatures of the resins.

Here, the peak Tan δ temperatures were measured by use of an MR-3000 liquid meter manufactured by Rheology Co. (that is, according to the cone plate method).

Protective coating layers 11 are all formed of ultraviolet ray curable urethane acrylate resins having the same Young's modulus of 70 kg/mm².

Glass having a diameter of 125 μm was used, the diameter of a hole in a die was selected in such a manner that the buffer coating layer 10 has a set outside diameter of 195 μm and the protective coating layer 11 has a set outside diameter of 250 μm, tne above-mentioned coating resins were used, and the wiredrawing speeds were changed in the range of 200-1,000 m/min., whereby coated optical fibers were manufactured. Table 1, shows the measured coated diameters (outside diameters) of the respective coated optical fibers.

TABLE 1

|  | Comp. Ex. 1 | Comp. Ex. 2 | Ex. 1 | Ex. 2 | Ex. 3 |
| --- | --- | --- | --- | --- | --- |
| Coating Resin | A | B | C | D | E |
| Viscosity (cps) at 25° C. | 5,000 | 3,000 | 3,000 | 2,000 | 6,000 |
| Temperature of peak Tan δ | 30° C. | 27° C. | 20° C. | 25° C. | 25° C. |
| Wiredrawing Speed (m/min.) |  |  |  |  |  |
| Outside Diameter (μm) |  |  |  |  |  |
| 200 | 198 | 194 | 194 | 193 | 196 |
| 400 | 205 | 198 | 195 | 195 | 198 |
| 600 | 209 | 200 | 197 | 106 | 199 |
| 1,000 | 212 | 203 | 197 | 197 | 200 |
| Variation of Outside Diameter (μm) | 14 | 9 | 3 | 4 | 4 |

From Table 1, it is found that the variations of the outside diameters are reduced as the peak Tan δ temperatures of the coating resins are lowered and, if the peak Tan δ temperature goes down to a temperature of 25° C. or less, then the diameter variations can be suppressed to a value of ±2 μm or less in a wiredrawing speed range of 200-1,000 m/min.

Especially, due to the fact that the outside diameter of the coated optical fiber constructed according to the speed of 600 m/min. or more, the present invention can produce a coated optical fiber of very high quality even if the wire-drawing speeds are varied.

However, in the case of the resin E which has a high viscosity of 6,000 cps, although the variation of the outside diameter was found in the allowable range, the absolute values of the coating outside diameter were found to show a tendency to be slightly higher than the set values.

Therefore, for the absolute value of the coating outside diameter, in order to finish the coating outside diameter as desired, the viscosity of the resin is desired to be 5,000 cps or less.

In the above examples, evaluation was conducted only on the buffer coating layer 10. However, of course, a similar effect can be expected of the protective coating layer 11 as well.

Also, in the above examples, as the coating material resin, the ultraviolet ray curable urethane acrylate resin is used. However, a similar effect can also be expected when other energy beam curable resins are used, which include an ultraviolet ray curable silicone resin, a thermosetting silicone resin, an ultraviolet ray curable epoxy acrylate resin, an ultraviolet ray curable silicone acrylate resin and the like.

As has been described heretofore, the present invention can provide a coated optical fiber having a coating diameter which is stable in a wide range of production speeds.

What is claimed is:

1. A coated optical fiber, comprising:
    an optical fiber formed by wiredrawing; and
    a coating layer provided on an outside of said optical fiber and made of an energy beam curable resin cured by irradiation of an energy beam;
    wherein said energy beam curable resin prior to be cured has a temperature peak of mechanical loss tangent, Tan δ of 25° C. or less.

2. A coated optical fiber as claimed in claim 1, wherein said optical fiber is formed at wiredrawing speeds of 600 m/min. or higher.

3. A coated optical fiber as claimed in claim 1, wherein the viscosity of said energy beam curable resin at a temperature of 25° C. is in the range of 2,000 cps to 3,000 cps.

4. A coated optical fiber as claimed in claim 1, wherein said energy beam curable resin is one selected from a group consisting of an ultraviolet ray curable urethane acrylate resin, an ultraviolet ray curable silicone resin, a thermosetting silicone resin, an ultraviolet ray curable epoxy acrylate resin, an ultraviolet ray curable silicone acrylate resin, an ultraviolet ray curable ester acrylate resin, and a polyvinylidene fluoride resin.

5. A method of producing a coated optical fiber, comprising the steps of:
    forming an optical fiber by wiredrawing;
    coating said optical fiber with an energy beam curable resin having a temperature peak of mechanical loss tangent, Tan δ, of 25° C. or less prior to be cured; and
    curing said energy beam curable resin by irradiation of an energy beam.

6. A method of producing a coated optical fiber as claimed in claim 5, wherein said optical fiber is formed at wiredrawing speeds of 600 m/min. or higher.

7. A method of producing a coated optical fiber as claimed in claim 5, wherein the viscosity of said energy beam curable resin at a temperature of 25° C. is selected in the range of 2,000 cps to 3,000 cps.

* * * * *